Feb. 19, 1957  J. R. FURRER  2,781,731
SUSPENSION FOR LIGHT WEIGHT VEHICLES
Filed Oct. 19, 1951  3 Sheets-Sheet 1
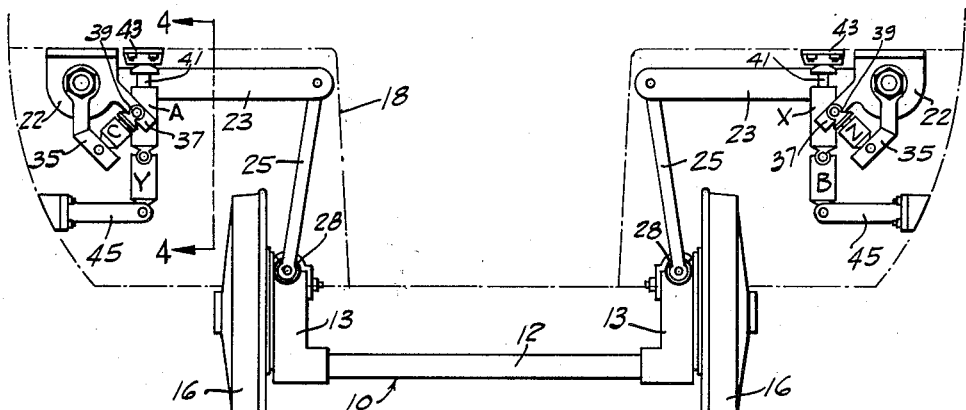
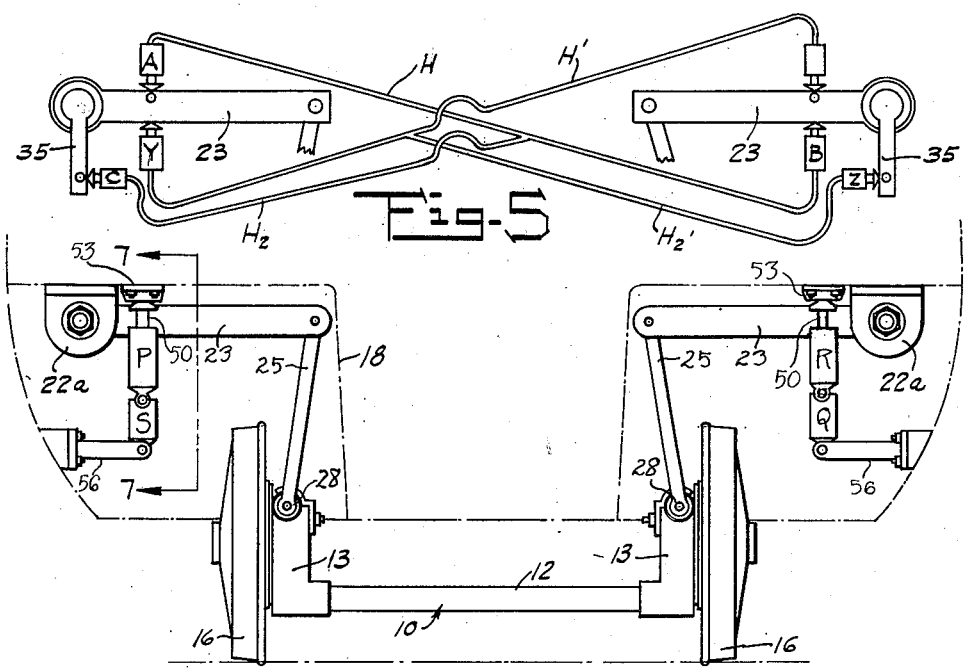
INVENTOR
JOHN R. FURRER
BY
George R. Ericson
ATTORNEY

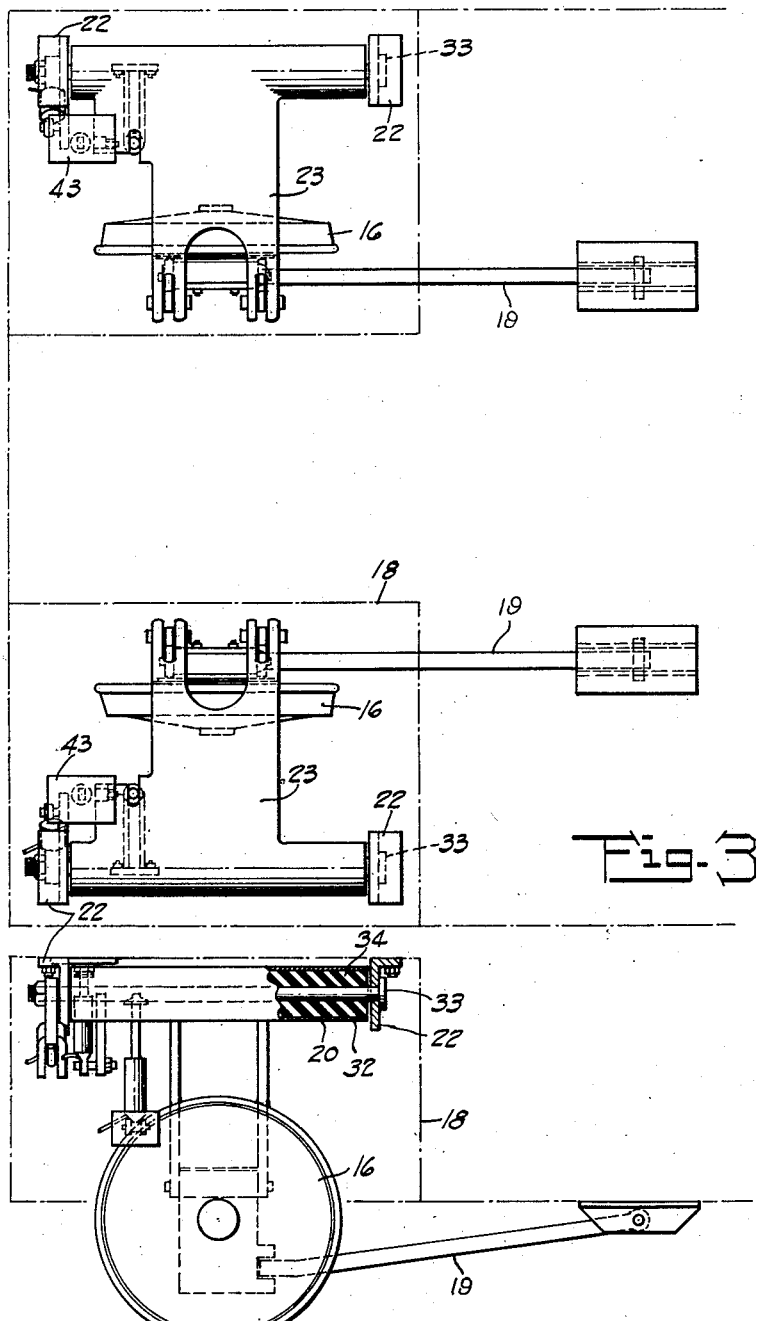

Feb. 19, 1957 J. R. FURRER 2,781,731
SUSPENSION FOR LIGHT WEIGHT VEHICLES
Filed Oct. 19, 1951 3 Sheets-Sheet 3
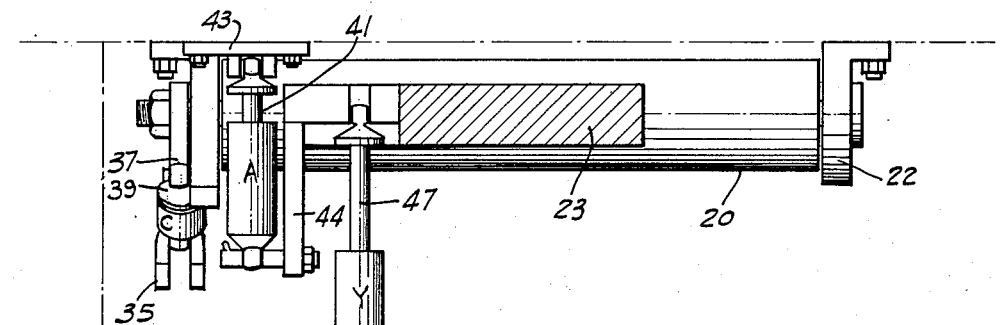
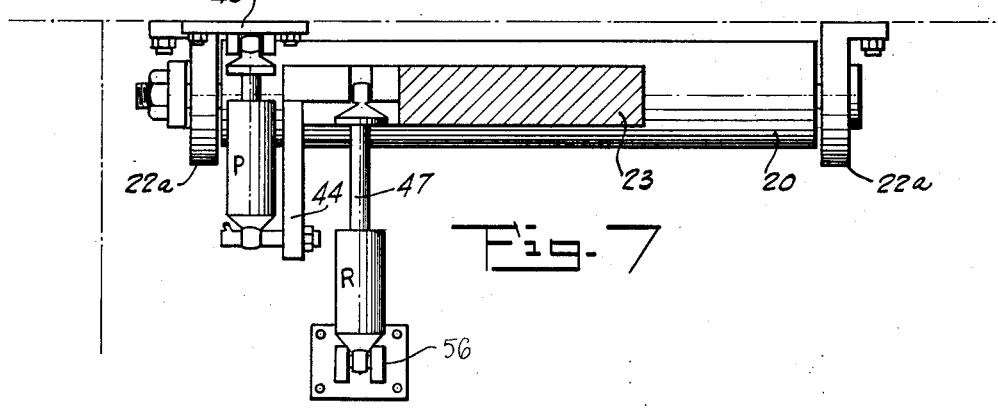
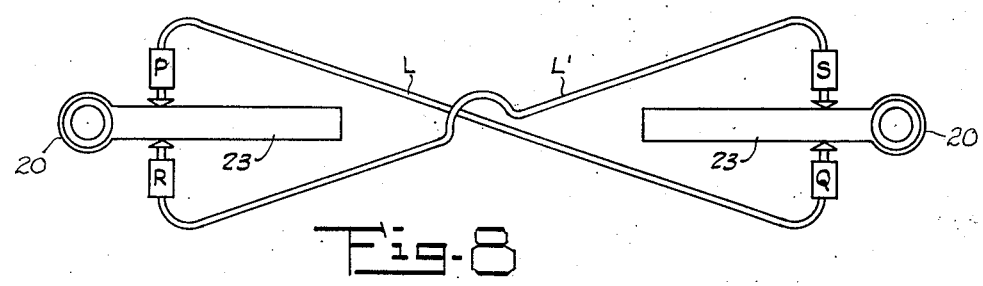
INVENTOR
JOHN R. FURRER
BY
ATTORNEY United States Patent Office
2,781,731
Patented Feb. 19, 1957

2,781,731
SUSPENSION FOR LIGHT WEIGHT VEHICLES

John R. Furrer, Milwaukee, Wis., assignor to ACF Industries Incorporated, a corporation of New Jersey Application October 19, 1951, Serial No. 252,111

15 Claims. (Cl. 105—210)

This invention relates to vertical suspensions for light weight vehicles, and consists particularly in means for minimizing roll and pitch of such vehicles while at the same time providing sufficient resiliency to absorb road shocks.

One of the basic considerations in the riding qualities of any vehicle is the relationship between the sprung and unsprung weight. Generally speaking, the greater the ratio of sprung to unsprung weight, the better the vehicle rides. This conclusion is derived from the fact that the greater inertia of a greater sprung weight (the body of the vehicle) as opposed to the lesser inertia of a lesser unsprung weight (the running gear of the vehicle) produces a dynamic relationship whereby the running gear will be able to move without substantially moving or overcoming the inertia of the heavier body mass.

In building light weight vehicles, it has been found very difficult to reduce the weight of the running gear (the unsprung weight) in as high a proportion as the weight of the body may be reduced, since vehicle bodies are often unreasonably heavy and can be reduced in weight without substantially changing structural qualities, while running gears, having to absorb road shocks as well as support the vehicle, must have very substantial structural qualities and hence weight. This being the case, light weight vehicles tend to have an unfavorable relationship between sprung and unsprung weight—i. e. the sprung weight is unfavorably low with relation to the unsprung weight.

Since an unfavorable ratio of sprung to unsprung weight is inherent in light weight vehicles, means other than relatively great sprung weight must be utilized to make light weight vehicles ride well. The most obvious means of making a light weight vehicle ride well is by using soft springs (i. e. springs with a large deflection per pound of weight applied). When using springs soft enough to give a very good ride however, the very softness of the springs and the consequent high rate of deflection permits the cars to roll and pitch excessively. Thus, it is desirable to find a means whereby a soft spring can be coupled with the stability of a harder spring.

Accordingly, it is the object of this invention to provide suspension means for light weight vehicles combining the shock absorbing qualities of soft springs with the stability characteristics of harder springs.

These and other objects of the invention will be apparent to those skilled in the art from a study of the following description and accompanying drawings, in which:

Fig. 1 is an end view of one form of suspension and stabilizing means as applied to a light weight railway vehicle.

Fig. 2 is an elevation of the suspension and stabilizing means illustrated in Fig. 1.

Fig. 3 is a plan view of the suspension and stabilizing means shown in Figs. 1 and 2.

Fig. 4 is a longitudinal vertical sectional view along the line 4—4 of Fig. 1.

Fig. 5 is a schematic view of the hydraulic stabilizing system shown in Figs. 1–4.

Fig. 6 is an end view of a modified form of stabilizing means applied to a light weight railway vehicle suspension.

Fig. 7 is a vertical sectional view along the line 7—7 of Fig. 6.

Fig. 8 is a schematic view of the stabilizing system shown in Figs. 6 and 7.

Referring now to the drawings, the reference character 10 indicates a drop axle structure consisting of transverse central portion 12 and upstanding arms 13 secured at each end of transverse portion 12. Stub axles (not shown) are secured to and extend outwardly from upstanding arms 13 and provide a rotatable mounting for flanged track wheels 16. A light weight car body 18 is resiliently suspended from axle structure 10. Radius rods 19, as described in copending application Serial No. 729,236, filed February 18, 1947, Letters Patent No. 2,685,845 issued August 10, 1954, are pivotally connected to the body and to the axle structure to restrict longitudinal displacement of the one with respect to the other.

The vertical suspension means includes a pair of rubber-in-torsion springs 20 mounted in body brackets 22 and having inwardly extending arms 23. Struts 25 are pivotally connected at their upper ends to arms 23 and at their lower ends to axle arms 13. Struts 25 and axle arms 13 are pivotally connected by rubber-in-torsion springs 28 which act as lateral stabilizers for resiliently limiting lateral movement of the car body with respect to the axle structure. Torsion springs 20 are similarly set at a predetermined tension and so maintained by cylinders C and Z to normally urge arms 23 downwardly, thereby providing a resilient vertical support for the car body with respect to the axle structure. The rubber-in-torsion springs 20 normally provide relatively high resiliency, thereby to most effectively absorb road shocks. However, as has been pointed out above, such very soft springs permit excessive rolling and pitching of the cars. To compensate for this rolling and pitching tendency inherent in soft spring suspensions, I provide means responsive to rotations of the body in the transverse vertical plane for varying the tension individually in springs 20. In effect, when for any reason, such as roll, one of the struts 25 is urged upwardly further than the other, the mechanism which will be described below winds up the inner shaft of the spring associated with said strut thereby providing additional resistance to the upward movement of the strut and also returning the strut to its normal position, so that the tendency of the car body to roll and pitch excessively is thus discouraged.

The action described above is accomplished by a hydraulic system best shown schematically in Fig. 5. Referring to Fig. 2, it will be noted that the rubber-in-torsion spring 20 consists of an outer shell 32, an inner shaft 33, and an intermediate mass of rubber 34 bonded to the shaft and to the exterior shell. Shaft 33 is rotatably journalled at its ends in body brackets 22 and has a downwardly extending arm 35 rigidly secured to one end. As best seen in Fig. 1, body brackets 22 are formed with a downwardly extending extension 37 which provides a pivotal mounting for plunger 39 of hydraulic cylinders C and Z, which are pivotally secured to arms 35. Plungers 39 are provided with shouldered stop portions so that in the absence of the application of pressure, extension 37 and arms 35 are separated a predetermined minimum distance thereby retaining shaft 33 in predetermined minimum relation with shell 32 whereby the initial predetermined minimum tension is constantly maintained in the rubber portion of spring 20. For controlling cylinders C and Z, a pair of hydraulic cylinders A and Y are located on the same side of the vehicle as cylinder C, and an identical pair of cylinders X and B are located on the opposite side of the vehicle, with cylinder Z. The functional relationship between the cylinders may be best understood by reference to Fig. 5. It will be noted that cylinders A and X are responsive respectively to upward and downward movements of the left hand and right hand arms 23 and that cylinders Y and B are actuatable by downward movements respectively of left and right hand arms 23. Cylinders A and B are connected by hydraulic line H with a branch H₂ extending to cylinder C. Similarly cylinders X and Y are connected by a line H' having a branch H₂' extending to cylinder Z. In operation, if the car rolls to the left, so viewed in Fig. 1, the left hand arm 23 assumes a tilted position in which the left hand end of the arm is lower than the right hand end of the arm, fluid will be forced from cylinders A and B into cylinder C thereby urging arm 35 to the left so that left hand spring 20 is tensed additionally in the clockwise direction thereby urging left hand arm 23 downwardly. Such tilting movement of left hand arm 23 causes upward leveling movement of the left side of the car body and consequent release of pressure in cylinders A and B, thus relieving pressure in cylinder C and permitting left hand arm 35 and shaft 33 to return to normal positions with a consequent reduction to normal tension in left hand spring 20. When the car rolls to the left, as described above, tilting movement of left hand arm 23 frees the plunger of cylinder Y. Since in the case described right hand arm 23 remained in its previous position, the pressure in cylinder X remains unchanged. Furthermore, since cylinder Y was freed by tilting movement of left hand arm 23, no pressure is developed in lines H' and H₂' and cylinder Z remains in its closed position. When the body rolls toward the right, as viewed in Fig. 1, cylinders X, Y, and Z function the same as A, B, and C, respectively, in the above description. It should be noted that the relative size of the pistons A, B, X and Y as opposed to the actuating pistons C and Z and the relative distance of fastening the pistons A, B, X and Y from the central core of the springs 20, as opposed to the relative distance of fastening the actuating pistons C and Z from the central core of the springs, is such that an unbalanced position of the arms will be substantially reflected in a winding up of the inner core of the proper spring rather than being reflected in an upward movement of piston B or Y. It should be noted further that the system shown schematically in Fig. 5 only varies the tension between the two springs 20 when the car rolls or is under unequal sidewise loading. During normal purely vertical movements of the car body the system will remain in a state of equilibrium since arms 23 moving upwardly and downwardly together will develop no hydraulic pressure in the two systems, and consequently will not actuate cylinders Z and C.

As the struts 25 tilt upwardly toward the longitudinal center of the body structure, the strut in the direction of sideshift of the body structure will move toward vertical position. Such strut movement will tend to tilt the associated arm because the left hand end, as viewed in Fig. 1, will move down causing increased torsion in the associated spring 20. The torsion of such spring will be thereby increased the same as when the body structure rolls toward the left and has the effect of resisting movement of arm 25 to upright vertical position. Such resistance adds to that of rubber mounting 28 in resisting sidewise shifting of the body structure.

The actual mechanical interconnection between the hydraulic cylinders and the rest of the spring suspension is best seen in Figs. 1 and 4. Plungers 41 of cylinders A and X are pivotally mounted on the car body by means of brackets 43, the lower ends of cylinders A and X being pivotally mounted on brackets 44 depending from arms 23 so that upward movements of arms 23 cause a compressive movement of cylinders A and X with respect to plungers 41, downward movement of arm 23 causing an expansion movement of cylinders A and X with respect to plungers 41. Cylinders B and Y are pivotally mounted at their lower ends on body brackets 45 and their plungers 47 are mounted at their upper ends for buffing engagement with arms 23 so that downward movements of arms 23 cause a compression movement of plungers 47 with respect to cylinders B and Y, and upward movements of arms 23 free the plungers 47 for possible expansion movement as described above in connection with Fig. 5.

Figs. 6, 7, and 8 show a modified form of the invention in which the numerals 10—22a refer to an axle and spring suspension identical to that shown in Figs. 1, 2, and 3 with the exception that brackets 22a are formed without the extensions 37 of brackets 22. Springs 20 of Figs. 6, 7 and 8 are not automatically adjustable as in the suspension arrangement of Figs. 1 to 5, the shaft 33 being secured rigidly against rotation relative to brackets 22a.

Fig. 8 shows a schematic view of a modified hydraulic stabilizing means which consists essentially of two pairs of hydraulic cylinders P and Q and R and S, cylinders P and R being arranged for compression responsive to upward movements of left hand arm 23 and cylinders Q and S being arranged for compression responsive to downward movement of right hand arm 23. Cylinders P and Q are connected by a hydraulic line L whereby, as the car rolls to the left and arm 23 urges the plunger of cylinder P upwardly, fluid will be forced through line L into cylinder Q, urging the plunger of Q upwardly a distance equivalent to the P plunger and so raising right hand arm 23 the same amount as the left hand arm. Thus, the right hand side of the car is lowered to the same level as the left hand side. Tension in spring 20 returns the entire system to its normal position with arms 23 substantially horizontal. Cylinders R and S are similarly connected by a hydraulic line L' and function in a manner similar to cylinders P and Q when the vehicle body rolls to the right.

The actual mechanical interconnection between cylinders P, Q, R, and S is best seen in Figs. 6 and 7. Plungers 50 of cylinders P and R are pivotally mounted on the car body by means of brackets 53, the lower ends of cylinders P and R being pivotally mounted on brackets 44 depending from arms 23 so that upward movements of arms 23 cause a compressive movement of cylinders P and R with respect to plungers 50, downward movement of cylinders P and R causing an expansion movement of cylinders P and R with respect to the plungers 50. Cylinders Q and S are pivotally mounted at their lower ends on body brackets 56 and their plungers 47 are mounted at their upper ends for buffing engagement with arms 23, so that upward movement of the plungers of cylinders Q and S responsive to compression movements of cylinders P and R, respectively, will urge their respective arms 23 upwardly substantially as described above in connection with Fig. 8.

The invention may be modified in various respects as will occur to those skilled in the art and the exclusive use of all modifications as come within the scope of the appended claims is contemplated.

What is claimed is:

1. In a vehicle, a body, an axle structure, wheels journalled on said axle structure, separate similar suspension means supporting opposite sides of said body on opposite end portions of said axle structure, said supporting means including resilient means in torsion and normally opposing downward movement of the body, and a hydraulic interconnection between said suspension means responsive to rolling movements of said body for automatically varying the torsion of said suspension means to compensate for said movements.

2. In a vehicle, a body, an axle structure, wheels journalled on said axle structure, separate resilient structure supporting opposite sides of said body on opposite end portions of said axle structure, said resilient structures including rubber-in-torsion opposing lateral rolling movements of the body and a hydraulic interconnection between said resilient structures responsive to rolling movements of said body for automatically varying the tension in said resilient structures to increase the resistance to downward movement of either side of the body.

3. In a vehicle, a body, an axle structure, wheels journalled on said axle structure, separate resilient means including a pair of springs in torsion supporting opposite sides of said body on opposite end portions of said axle structure, and a hydraulic interconnection between said resilient means responsive to lateral rolling movements of said body for automatically increasing the tension in the torsion spring on the downward side of the vehicle body during lateral rolling movements.

4. In a vehicle, a body, an axle structure, wheels journalled on said axle structure, separate resilient means including a pair of springs in torsion supporting opposite sides of said body on opposite end portions of said axle structure, and a hydraulic interconnection between said resilient means for automatically raising the depressed side of said body to the same level as the opposite side.

5. In a vehicle, a body, an axle structure, wheels journalled on said axle structure, separate resilient means supporting opposite sides of said body and each including a torsion spring connected to the body mounted substantially longitudinally of said body and having an inwardly extending arm and a strut pivotally connected at its upper end to said arm and at its lower end with an end portion of said axle structure and normally inclined inwardly at the top, a pair of unconnected hydraulic systems each consisting of separate cylinders and piston structures associated with said body and arms and compressed respectively by upward movements of one arm and downward movements of the opposite arm, and a third cylinder operatively connected to the spring associated with said first-named arm for increasing the tension in said spring responsive to upward movements of said arm.

6. In a vehicle, a body, an axle structure, wheels journalled on said axle structure, separate resilient means supporting opposite sides of said vehicle body, said resilient means each including a torsion spring mounted substantially horizontally on said body and having a transversely extending arm, said torsion spring consisting of an outer cylindrical shell carrying said arm, a central shaft rotatably secured to said body, and a rubber mass in torsion between said shaft and said shell and bonded thereto, and a strut connecting said arm with an end portion of said axle structure, a pair of unconnected hydraulic systems each consisting of separate cylinders and pistons associated with the body arm and compressed respectively by upward movements of one arm and downward movements of the opposite arm, and a third cylinder operatively connected to the spring associated with said first-named arm for rotating said shaft and thereby increasing the tension in said spring responsive to upward movements of said arm.

7. In a vehicle having a body structure and an axle structure disposed adjacent one end of the body structure, a pair of similar structures supporting the body structure on the end portions of the axle structure each comprising a vertically extending strut pivoted at its lower end to the axle structure, a transversely extending arm pivotally connected at one end to the upper end of the strut, a bracket on the body structure, a shaft carried by the bracket with its axis extending longitudinally of the body structure, a sleeve on the outer end of the arm encircling the shaft, and a mass of deformable resilient material disposed between and bonded to the shaft and the sleeve, said mass being in torsion and exerting a force normally resisting downward movement of the adjacent side of the body structure.

8. In a vehicle having a body structure and an axle structure disposed adjacent one end of the body structure, a pair of similar structures for supporting the body structure, on the end portions of the axle structure each comprising a vertically extending strut, a pivotal connection between the lower end of the strut and the axle structure including rubber in torsion opposing sidewise shifting of the body structure, a transversely extending arm pivotally connected at one end to the upper end of the strut, and a pivotal connection between the other end of said arm and the body structure including a torsion spring opposing downward movement of the body structure.

9. In a vehicle having a body structure and an axle structure disposed adjacent one end of the body structure, a pair of similar structures for supporting the body structure on the end portions of the axle structure each comprising a vertically extending strut, a pivotal connection between the lower end of the strut and the axle structure including rubber in torsion for resisting sidewise movement of the body structure, a transversely extending arm pivotally connected at one end to the upper end of the strut, a bracket on the body structure, a shaft carried by the bracket with its axis extending longitudinally of the body structure, a sleeve on the outer end of the arm encircling the shaft, and a mass of deformable resilient material disposed between and bonded to the shaft and the sleeve, said mass being in torsion and exerting a force normally resisting downward movement of the adjacent side of the body structure.

10. In a vehicle having a body structure and an axle structure disposed adjacent one end of the body structure, a pair of similar structures for supporting the body structure on the end portions of the axle structure each comprising a vertically extending strut pivoted at its lower end to the axle structure, a transversely extending arm pivotally connected at one end to the upper end of the strut, a bracket on the body structure, a shaft rotatably carried by the bracket with its axis extending longitudinally of the body structure, a sleeve on the outer end of the arm encircling the shaft, a mass of deformable resilient material disposed between and bonded to the shaft and the sleeve, said mass being in torsion and exerting a force normally resisting downward movement of the adjacent side of the body structure, and hydraulic means responsive to sidewise tilting of the body structure for increasing the torsion of the resilient material resisting downward movement of either side of the body structure.

11. In a vehicle having a body structure and an axle structure disposed adjacent one end of the body structure, a pair of similar structures for supporting the body structure on the end portions of the axle structure each comprising a vertically extending strut pivoted at its lower end to the axle structure, a transversely extending arm pivotally connected at one end to the upper end of the strut, a bracket on the body structure, a shaft rotatably carried by the bracket with its axis extending longitudinally of the body structure, a sleeve on the outer end of the arm encircling the shaft, a mass of deformable resilient material disposed between and bonded to the shaft and the sleeve, said mass being in torsion and exerting a force normally resisting downward movement of the adjacent side of the body structure, and means responsive to sidewise tilting of the body structure for increasing the torsion of the resilient material resisting downward movement of either side of the body structure.

12. In a vehicle having a body structure and an axle disposed adjacent one end thereof, a pair of similar structures supporting the body structure on the end portions of the axle, each comprising a strut tilted upwardly toward the longitudinal axis of the body structure, a pivotal connection between the lower end of the strut and the axle including rubber in torsion opposing sidewise movement of the body, a transversely extending arm pivotally connected at one end to the upper end of the strut, a pivotal connection between the other end of the arm and the body including means opposing downward movement of the body structure normally resulting from sidewise tilting of the body structure, and means responsive to sidewise tilting of the body structure for increasing the resistance to such movement.

13. In a vehicle, a body, an axle, separate body supporting structure including torsion springs supporting each side of the body on opposite ends of the axle, and a fluid pressure actuated control system including movable pressure generating elements connected to said body and said body supporting structure responsive to lateral rolling movements of the body for automatically increasing the resistance of said body supporting structure supporting the lower side of the vehicle while maintaining the resistance of said structure supporting the higher side of the vehicle substantially constant.

14. A vehicle according to claim 4, wherein said hydraulic interconnection includes a pair of hydraulic systems each having a pair of cylinder and piston devices responsive respectively to upward movements of one of said resilient means and to downward movements of the other resilient means, and a direct hydraulic connection betwen said cylinders.

15. A vehicle according to claim 12, wherein said means responsive to sidewise tilting of the body structure includes a pair of hydraulic systems each having a pair of cylinder and piston devices responsive respectively to upward movements of one of said arms and to downward movements of the other of said arms, and a direct hydraulic connection between said cylinders.

References Cited in the file of this patent
UNITED STATES PATENTS

| | | |
|---|---|---|
| 1,647,518 | Hawley | Nov. 1, 1927 |
| 1,990,798 | Richter | Feb. 12, 1935 |
| 2,007,254 | Pray | July 9, 1935 |
| 2,251,453 | Jackson | Aug. 5, 1941 |
| 2,474,471 | Dolan | June 28, 1949 |